US009574706B2

(12) United States Patent
Brown et al.

(10) Patent No.: US 9,574,706 B2
(45) Date of Patent: Feb. 21, 2017

(54) FOLDING IMAGE STABILIZER

(71) Applicant: Garrett W. Brown, Philadelphia, PA (US)

(72) Inventors: Garrett W. Brown, Philadelphia, PA (US); Jerry Holway, Exton, PA (US)

(73) Assignee: Garrett W. Brown, Philadelphia, PA (US)

(*) Notice: Subject to any disclaimer, the term of this patent is extended or adjusted under 35 U.S.C. 154(b) by 0 days.

(21) Appl. No.: 14/758,475

(22) PCT Filed: Jan. 3, 2014

(86) PCT No.: PCT/US2014/010177
§ 371 (c)(1),
(2) Date: Jun. 29, 2015

(87) PCT Pub. No.: WO2014/107574
PCT Pub. Date: Jul. 10, 2014

(65) Prior Publication Data
US 2015/0362122 A1    Dec. 17, 2015

Related U.S. Application Data

(60) Provisional application No. 61/748,782, filed on Jan. 4, 2013, provisional application No. 61/766,973, filed on Feb. 20, 2013.

(51) Int. Cl.
H04N 5/232    (2006.01)
F16M 13/04   (2006.01)
(Continued)

(52) U.S. Cl.
CPC ............ *F16M 13/04* (2013.01); *F16M 11/041* (2013.01); *F16M 11/123* (2013.01); *F16M 11/26* (2013.01);
(Continued)

(58) Field of Classification Search
CPC ...... F16M 13/04; F16M 11/123; F16M 11/26; F16M 13/00; F16M 11/041; F16M 11/38; F16M 2200/041; G03B 17/563; G03B 17/561; H04N 5/23248; Y10T 29/49002
(Continued)

(56) References Cited

U.S. PATENT DOCUMENTS 2,007,215 A * 7/1935 Remey .................. F16M 13/04
16/430
3,105,430 A  10/1963 Fernelius
(Continued)

OTHER PUBLICATIONS

International Search Report for PCT/US14/10177 dated Apr. 17, 2014.
(Continued)

*Primary Examiner* — Hung Lam
(74) *Attorney, Agent, or Firm* — Barnes & Thornburg LLP; Joan T. Kluger

(57) ABSTRACT

The invention is directed to a folding image-device stabilizer comprising a three-axis gimbal assembly adapted to be mounted as close to the image device payload to minimize the overall deployed size. The gimbal assembly includes mechanisms to adjustably position an image device so that the stabilizer is in balance fore and aft around the 'tilt' axis repeatedly when the stabilizer is folded and unfolded.

18 Claims, 14 Drawing Sheets

(51) Int. Cl.
*F16M 11/04* (2006.01)
*F16M 11/12* (2006.01)
*F16M 11/26* (2006.01)
*F16M 11/38* (2006.01)
*F16M 13/00* (2006.01)
*G03B 17/56* (2006.01)

(52) U.S. Cl.
CPC .............. *F16M 11/38* (2013.01); *F16M 13/00* (2013.01); *G03B 17/561* (2013.01); *G03B 17/563* (2013.01); *H04N 5/23248* (2013.01); *F16M 2200/041* (2013.01); *Y10T 29/49002* (2015.01)

(58) Field of Classification Search
USPC ............................... 348/372–374; 396/347.42
See application file for complete search history.

(56) References Cited

U.S. PATENT DOCUMENTS

| | | | |
|---|---|---|---|
| 3,266,403 A | 8/1966 | Anderson | |
| 3,760,906 A | 9/1973 | McGee | |
| 4,017,168 A | 4/1977 | Brown | |
| 4,030,114 A | 6/1977 | Telfer | |
| 4,158,489 A | 6/1979 | Gottschalk et al. | |
| 4,177,987 A | 12/1979 | Zimmerman | |
| 4,244,500 A | 1/1981 | Fournier | |
| 4,437,753 A | 3/1984 | Dunn | |
| 4,474,439 A | 10/1984 | Brown | |
| 4,545,660 A | 10/1985 | Rudolf | |
| RE32,213 E | 7/1986 | Brown | |
| 4,600,357 A | 7/1986 | Coules | |
| 4,640,481 A | 2/1987 | Kohno | |
| 4,650,142 A | 3/1987 | Stapleton | |
| 4,672,436 A | 6/1987 | Hawthorne | |
| 4,752,794 A | 6/1988 | Bohannon | |
| 4,946,272 A | 8/1990 | Brown | |
| 5,098,182 A | 3/1992 | Brown | |
| 5,229,798 A | 7/1993 | Brown | |
| 5,650,821 A * | 7/1997 | Hewlett | F16M 13/04 348/373 |
| 5,673,593 A | 10/1997 | Lafferty | |
| 5,742,859 A * | 4/1998 | Acker | F16M 11/20 348/E5.025 |
| 7,789,356 B1 | 9/2010 | Jones | |
| 8,033,527 B2 | 10/2011 | Pasto | |
| 8,534,934 B1 * | 9/2013 | Carney | F16M 11/02 248/178.1 |
| 9,057,935 B2 * | 6/2015 | Vieira Caeiro Dias Antunes | F16M 11/123 |
| 2006/0179917 A1 * | 8/2006 | Pringle | G01N 3/48 73/12.09 |
| 2012/0099851 A1 | 4/2012 | Brown | |
| 2012/0106941 A1 | 5/2012 | Greaves et al. | |
| 2012/0313324 A1 * | 12/2012 | Frickey | F41J 1/10 273/407 |

OTHER PUBLICATIONS

Written Opinion of the International Searching Authority for PCT/US14/10177 dated Apr. 17, 2014.

* cited by examiner

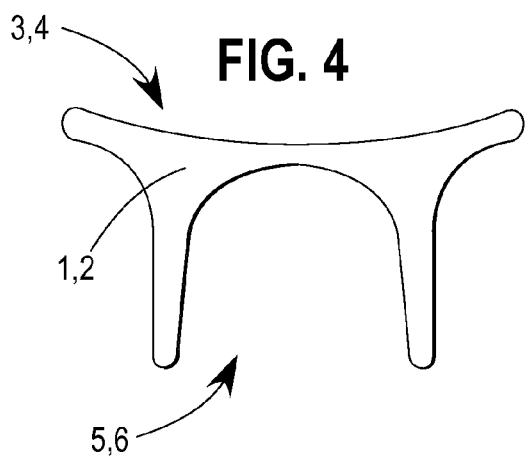
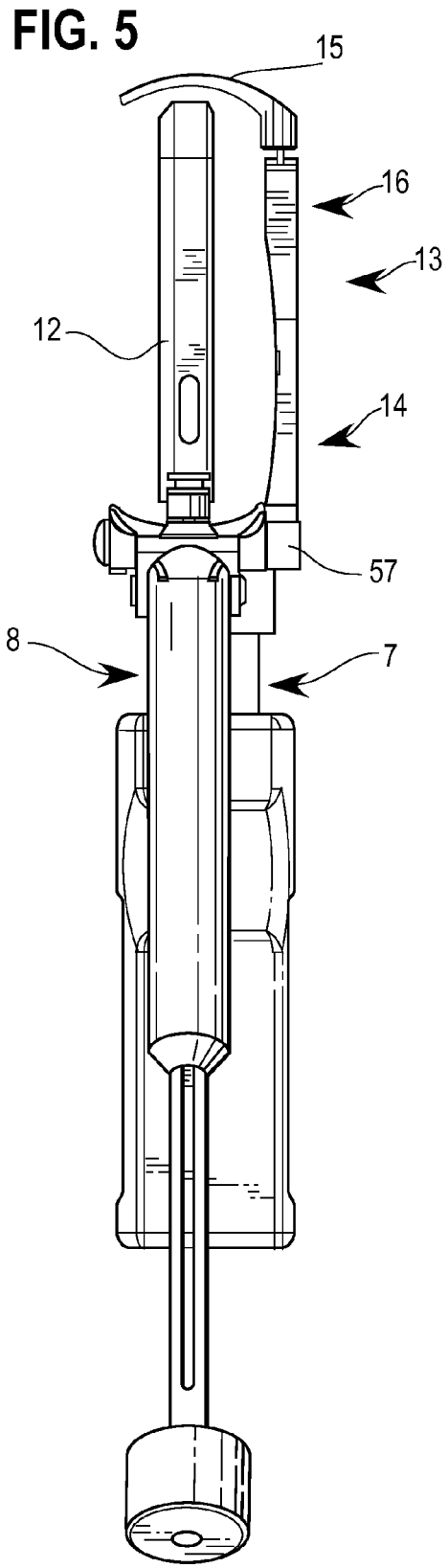

FOLDING IMAGE STABILIZER

This application claims priority to U.S. Provisional Patent Application Nos. 61/748,782, filed on Jan. 4, 2013; and 61/766,973, filed on Feb. 2, 2013, both entitled Folding Image Stabilizer.

BACKGROUND OF THE INVENTION

Smart-phone High-Definition videos have auto-focus and iris, and other 'smart' features that deliver extremely satisfying results—unless one attempts to walk. Though some models now include digital image stabilizers that reduce vibration caused by hand-holding, as soon as the operator moves around, image quality plummets due to unavoidable, larger-magnitude angular and spatial aberrations, and the results are shaky and disturbing.

For many years the human/camera interface has been smoothed by an invention marketed as the Steadicam® camera stabilizer, which can stabilize big, heavy production cameras as well as camcorders.

Efforts to create a camera stabilizer for small video devices, such as smartphones, have resulted in devices that add considerable weight and mass, and none yet permits a causal operator to achieve smooth camera moves that even come close to producing images of the quality we perceive through our own eyes.

What is needed is a camera stabilizer that can be used with relatively small video devices and preferably is light and compact and easy to use. easily balanced with a variety of phones and cases; that, when folded, is preferably as light and pocket-friendly as the user's phone; that unfolds in a set, repeatable balance; and that can be immediately employed for walk-around stable shots that require little or no particular skill, or by practiced operators to aggressively 'pan and tilt' shots that are dynamic, as well as artistic and smooth.

For purposes of description, the terms "pan," "tilt," and "roll" will be used to describe the angular motions of image devices, which are the terms used in the motion picture and TV industries to define camera moves. Moves about a substantially vertical axis perpendicular to the lens axis are 'pan' moves. Those about the lens axis are 'roll' moves. Moves about an axis that is substantially mutually perpendicular to the pan and roll axes are tilt moves.

SUMMARY OF THE INVENTION

An illustrative embodiment of the invention is directed to a folding image-device stabilizer comprising a "miniaturized", three-axis gimbal assembly which comprises integral 'pan' bearings within a gimbal inner mounting block, and so is adapted to be mounted as close as possible to the image device payload in order to minimize the overall deployed size, including counterweights, if any. The gimbal assembly is adapted to provide three degrees of angular freedom between a supporting handle shaft and a supported balanced payload. The gimbal assembly preferably includes mechanisms to be adjustably positioned so that the entire stabilizer is in approximately balance fore and aft around the 'tilt' axis. Illustrative embodiments of the invention provide the inertia of expanded balanced masses and the isolation and support of a gimbal, to reduce external angular influences on its image-device payload.

Various improvements to the prior art contribute to the benefits of the invention by reducing the size of the gimbal assembly and the distance from its center to image-device payload, and permitting its slit outer gimbal ring to become the means for both angular control and compact folding.

DESCRIPTION OF THE DRAWINGS

Illustrative embodiments of the invention are best understood from the following detailed description when read with the accompanying drawings.

FIG. 4 depicts a cross section of a stabilizer wing according to an illustrative embodiment of the invention FIG. 5 depicts a side view of a stabilizer with an image device according to an illustrative embodiment of the invention.

DETAILED DESCRIPTION OF THE INVENTION

Figure 1:
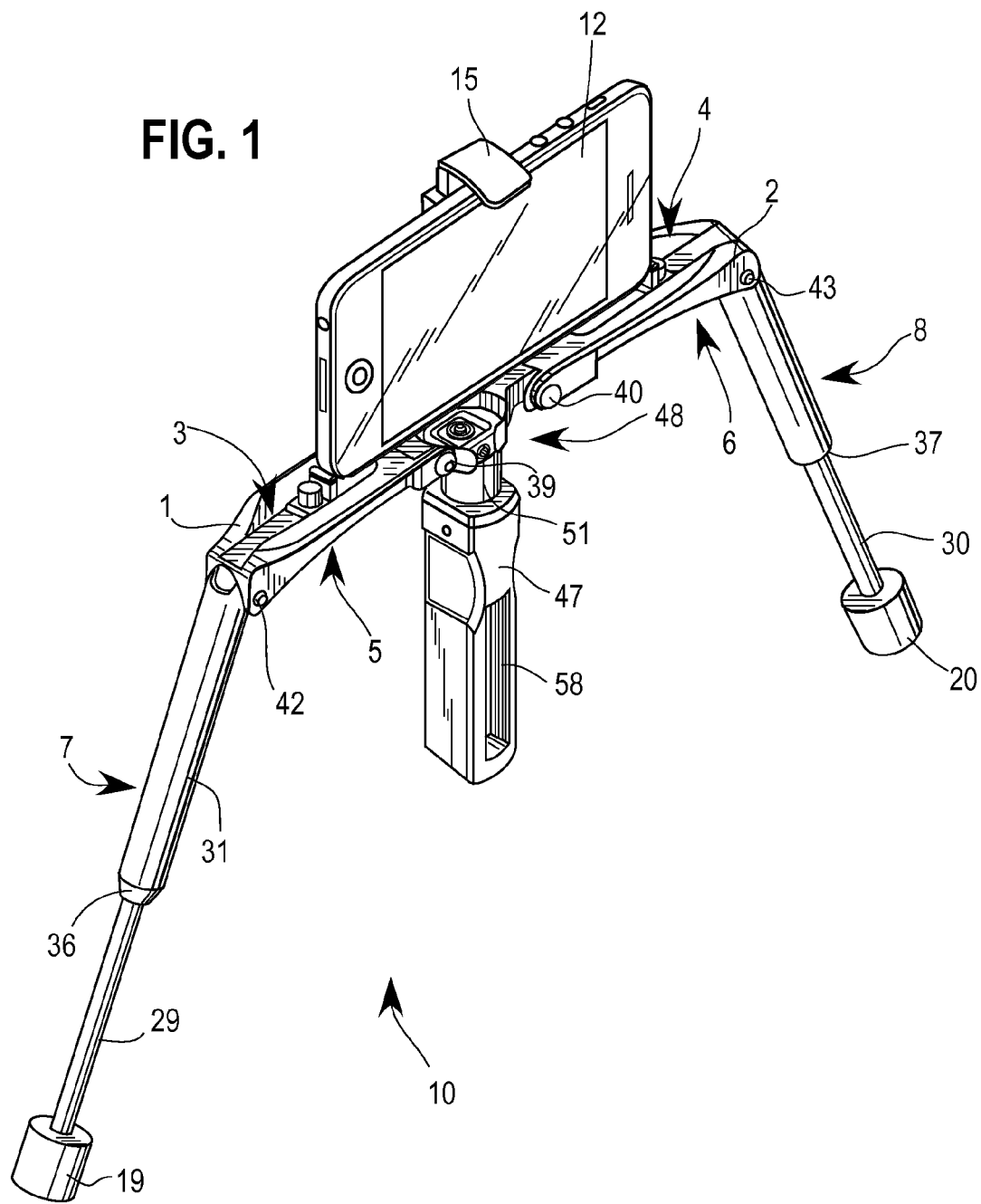
FIG. 1 depicts a folding image-device stabilizer with a payload according to an illustrative embodiment of the invention.
Figure 2:
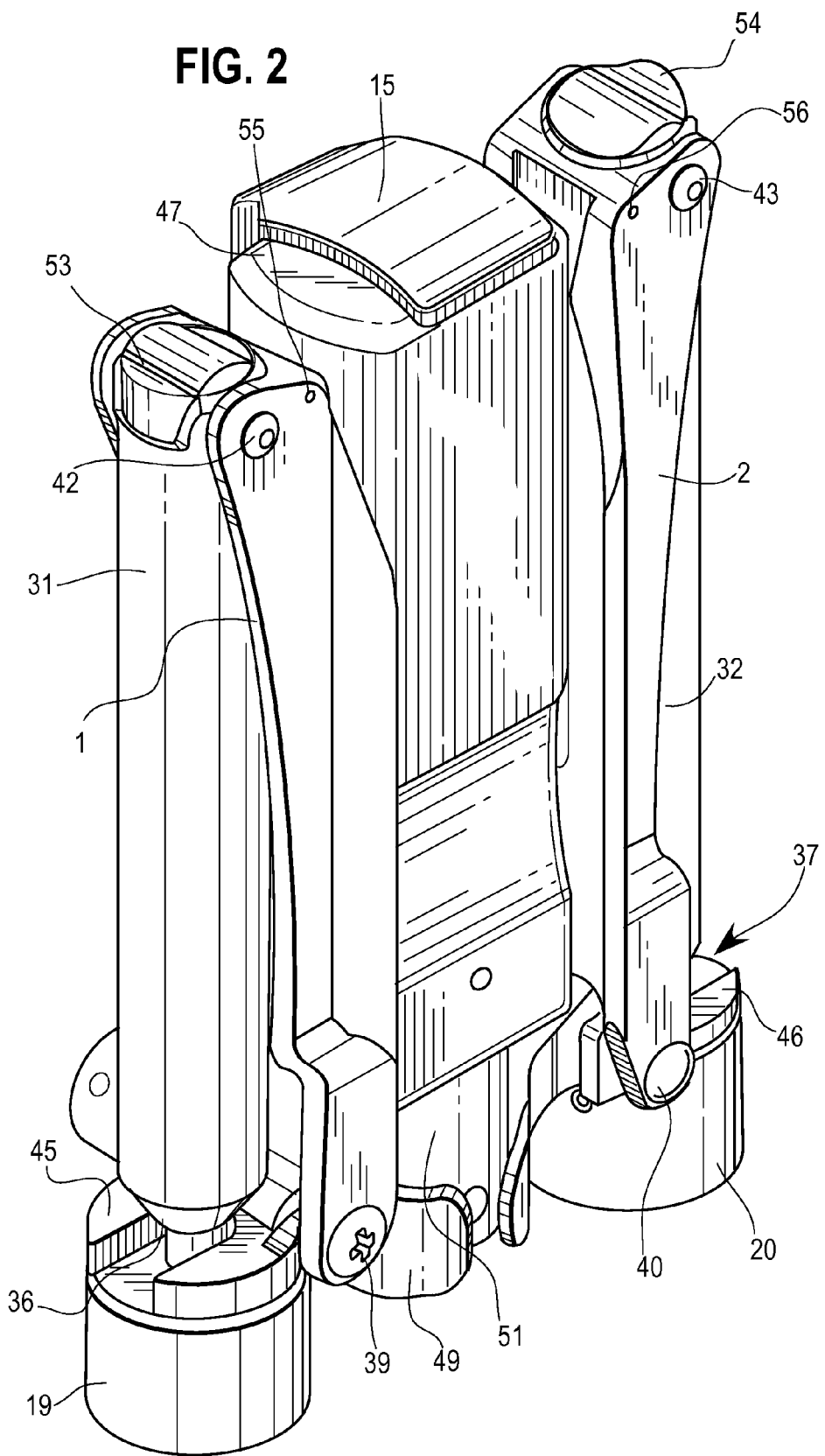
FIG. 2 depicts a stabilizer in a folded position according to an illustrative embodiment of the invention.
Figure 3:
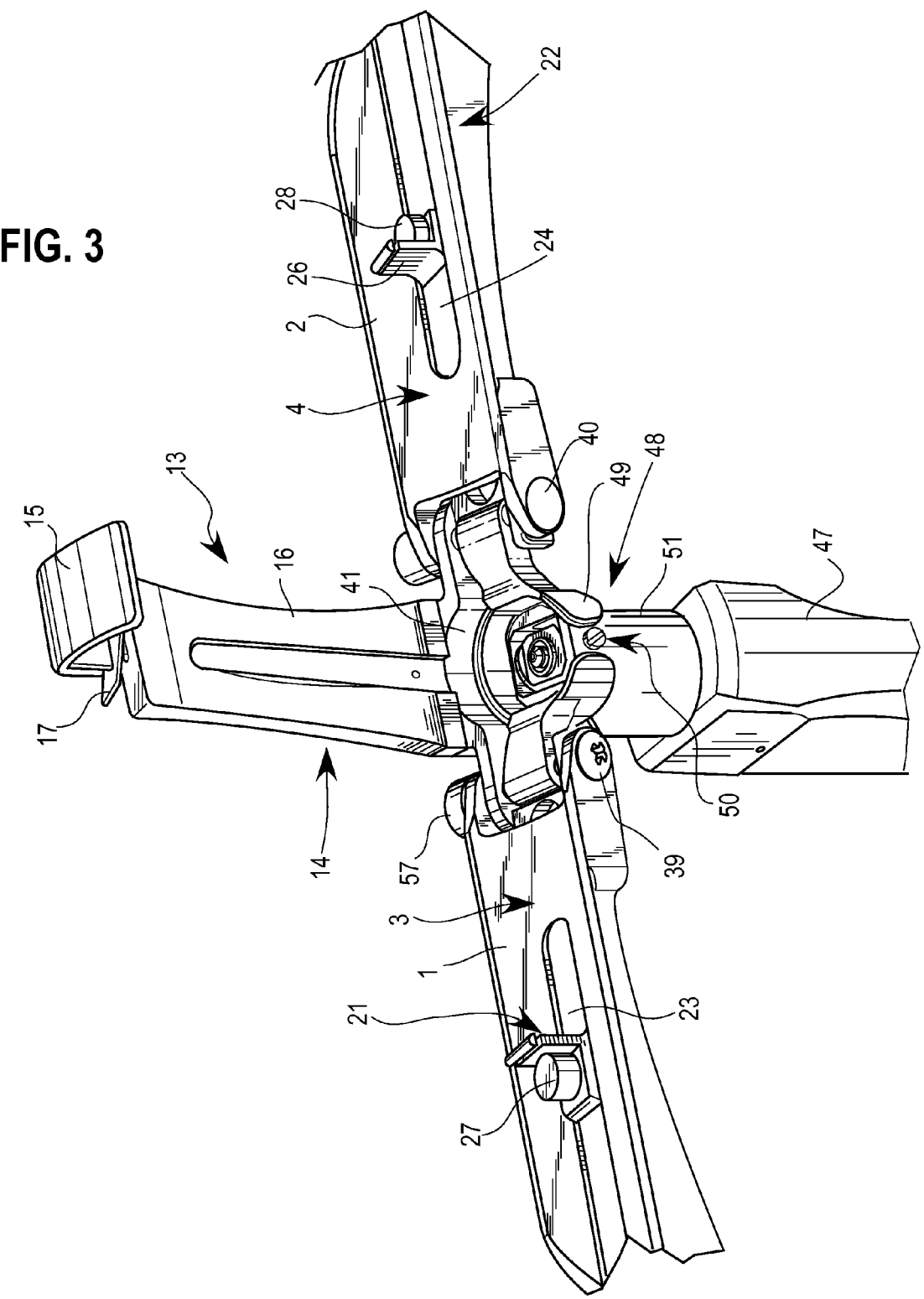
FIG. 3 depicts a close up view of an upper portion of the stabilizer of FIG. 1 according to an illustrative embodiment of the invention.

FIGS. 1, 2 and 3 depict an image device stabilizer according to illustrative embodiments of the invention. FIG. 1 depicts a folding image device stabilizer 10 in an operating mode having a payload 12. FIG. 2 depicts stabilizer 10 in a folded position. FIG. 3 depicts a close up view of an upper portion of stabilizer 10 without a payload.

Stabilizer 10 has opposing, pivoting wings 1, 2. FIG. 4 depicts a cross section of wings 1 or 2. Each of wings 1, 2 has opposing troughs along a portion of their lengths, troughs 3 and 5 on wing 1 and troughs 4 and 6 on wing 2.

When folded, trough 5 of wing 1 partially encloses telescopic leg 7, and trough 3 captures handle 47. Similarly, trough 6 of wing 2 partially encloses telescopic leg 8, and trough 4 captures handle 47. Axles and hinges associated with wings 1, 2 may also be accommodated by the troughs. When wings, 1, 2 are unfolded they collectively provide an elongated mounting surface for image device payload 10. Preferably, wings 1, 2 can accommodate smartphones or similar devices of a variety of sizes and weights, including various protective covers.

The image device may contribute to the structural integrity of the stabilizer since it is clamped down firmly to the mounting surface on both wings 1, 2 and thereby spans the wings' u-shaped openings in bridge 41 and is disposed along side of an opening 50 in outer gimbal ring 49 so it adds its structural rigidity to the overall stiffness of the stabilizer.

FIG. 5 depicts a side view of stabilizer 10, in which portions of a clamping device 13, can be seen. Image device 12 can sit in troughs 3, 4 and be retained by a back portion 14 and a clamp plate 15. Back portion 14 has a clamping strip 16, attached to clamp plate 15, which can be pushed down as required to secure image device 12. Clamp plate 15 is preferably lined underneath with slightly resilient material. Clamp lever 17, which is preferably spring-loaded, and can be seen in FIG. 3, can be depressed to release clamp strip 16 and free image device 12 for removal. In an illustrative embodiment of the invention, troughs 3, 4 and clamp plate 15 are significantly wider than the cross-section of the image device 12 shown. They are preferably sized to accommodate the image device cases, which currently approach about 0.7 inch in width. The length of clamping strip 16 is sized to extend top clamp plate 15 high enough to secure the upper end of devices such as smart phones of various sizes. Weights 19, 20 can be employed on either side of telescopic legs 7, 8, respectively, to counter the weight of the image device, including the device's case if necessary or chosen. The weights can be symmetrical or eccentric in dimension, and can be rotatable adjustment of balance.

Figure 14:
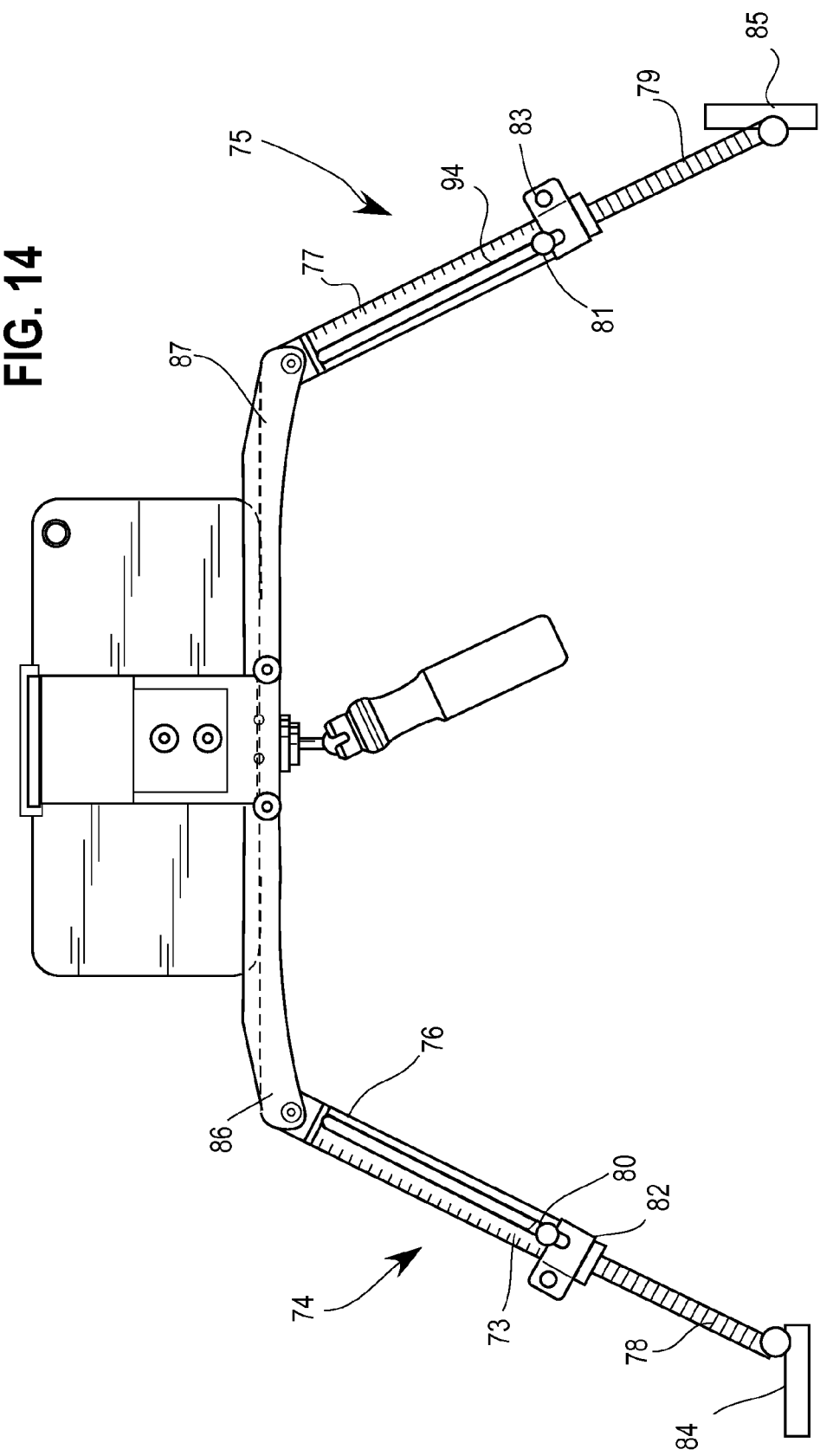
FIG. 14 depicts an unfolded stabilizer according to a further illustrative embodiment of the invention.

FIG. 14 shows an unfolded stabilizer according to a further illustrative embodiment of the invention. In this embodiment, telescoping legs 74, 75 include outer tubes 76, 77 and inner tubes 78, 79. Outer tubes 76, 77 are slotted. Inner tubes 78, 79 are tapped so that stop-screws 80, 81 can be installed to pass through slots 93, 94 in tubes 76, 77. Traveling clamps 82, 83 can then be tightened in place as required to, in effect, 'remember' the extension of inner tubes 78, 79 that resulted in the desired bottom heaviness.

Counterweights 84, 85 are employed to fine trim horizontal balance and bottom-heaviness. Weight 84 as shown, is eccentrically mounted to a "vertical-axis" pivot so that its rotation swings its center-of-mass around in the "horizontal" plane, so the balanced verticality of the stabilizer can be fine adjusted in both the tilt and roll axes.

Counterweight 85 pivots on a horizontal axis and so can fine trim balance in the tilt axis and bottom-heaviness. Weights 84, 85 partially overlap in function in the tilt axis, but judicious adjustment can produce fine trim as needed to achieve both stabilizer verticality and desired bottom-heaviness. A Vernier device can be employed to facilitate the adjustments. The stabilizer depicted in FIG. 14 can be folded in an analogous manner to stabilizer 10 shown, for example, in FIGS. 1, 2 and 11.

The stabilizer can also be configured to accommodate weights in the vicinity of the payload. For example, a tapped hole can be included in top clamp plate 15 to accept one or more weights. This may be advantageous if the device being stabilized is particularly light weight.

As shown in FIG. 3, the mounting surface formed by wings 1, 2 has end-stops 21, 22, respectively. End stops 21, 22 adjustably set the location of the image device upon the mounting surface to balance the stabilizer from side-to-side around the 'roll' axis. In this embodiment, once the locations are set, they will be maintained during folding and unfolding of the stabilizer apparatus. In the illustrative embodiment shown in FIG. 3, end stops 21, 22 comprise slots 23, 24 along which brackets 25, 26 can be slid. The positions of brackets 25, 26 can be secured using knobs 27, 28, which each drive a threaded extension into a complimentary hole, thereby tightening brackets 25, 26 to the mounting surface. This renders the lateral position of the image device repeatable. The configuration shown in FIG. 3 provides continuous adjustability along the slotted length. Other end stop configurations that restrict adjustability to discrete spacing can also be used such as ratchet components, for example. End-stops 23, 24 may also provide Vernier adjustability, such as by substituting small, horizontal axis worm wheels for knobs 27, 28 and providing longitudinal worm-gears in conjunction with slots 23, 24. In addition to longitudinal end-stops 23, 24, transverse stops across wings 1, 2 may be used to preset image device 12 to a balanced position in the tilt axis.

Figure 8:
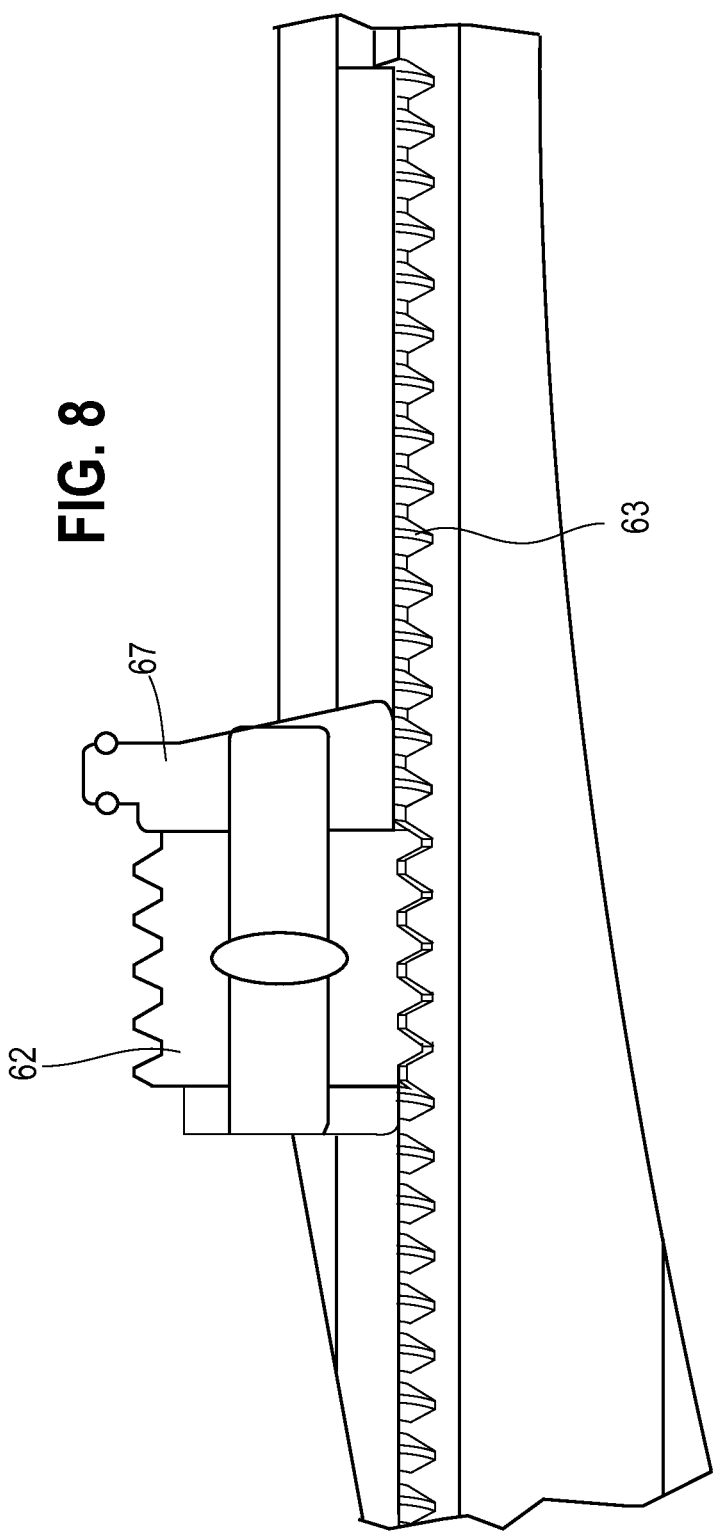
FIG. 8 depicts a cross sectional view of a worm wheel end stop mechanism according to an illustrative embodiment of the invention.
Figure 9:
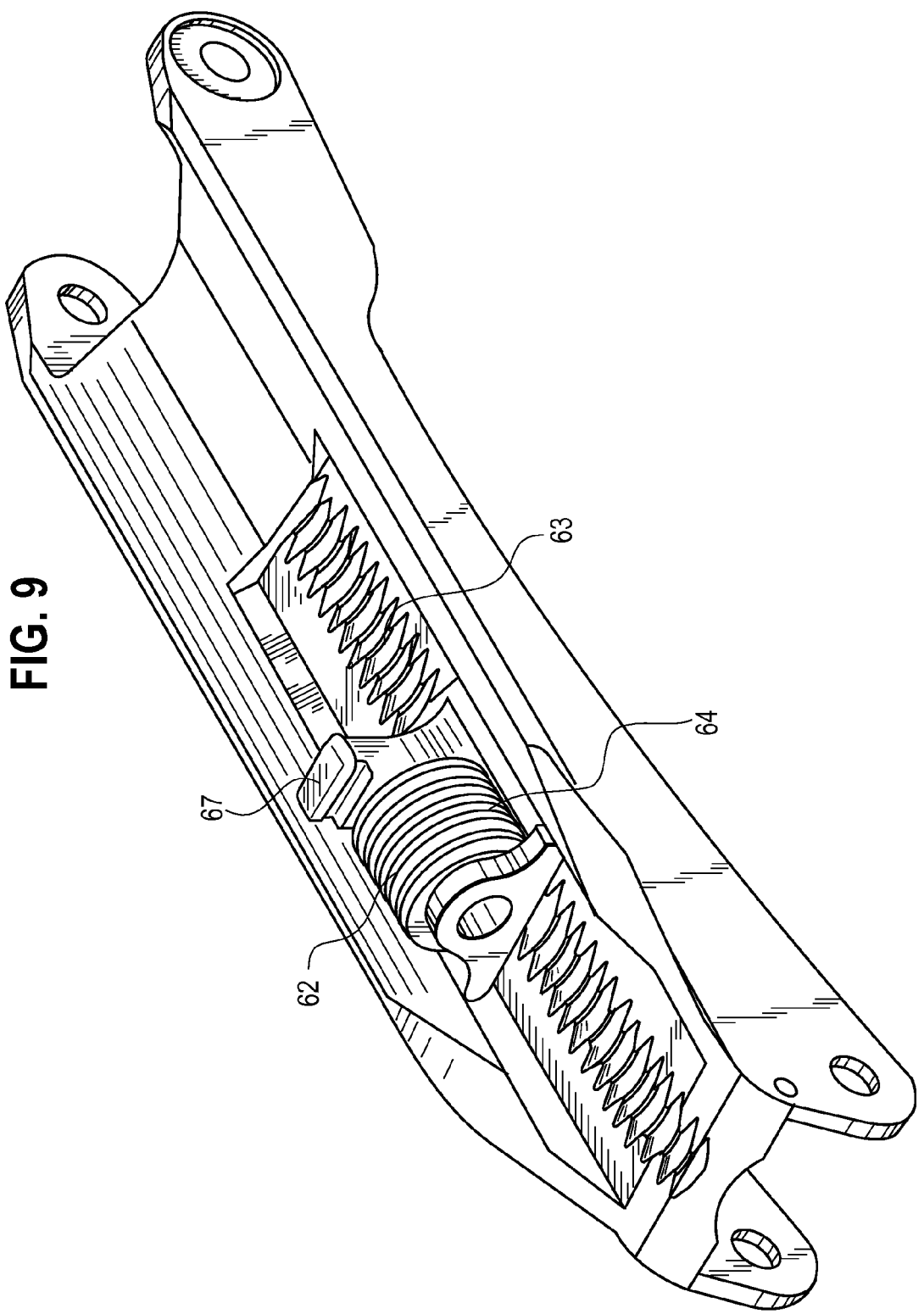
FIG. 9 depicts a perspective view of a worm wheel end stop mechanism according to an illustrative embodiment of the invention.

FIGS. 8 and 9 depict an alternative image device location adjustment mechanism, in the form of a worm wheel, to adjust end stops positioned on stabilizer wings 1, 2. FIG. 8 is a cross-sectional view of the mechanism and FIG. 9 is a perspective view. Wheel 62 may be rotated by an operator's finger to cause end stop 67 to travel along teeth 63 by engagement with threads 64 of wheel 62. A worm wheel mechanism can be placed on each of wings 1, 2.

Figure 6:
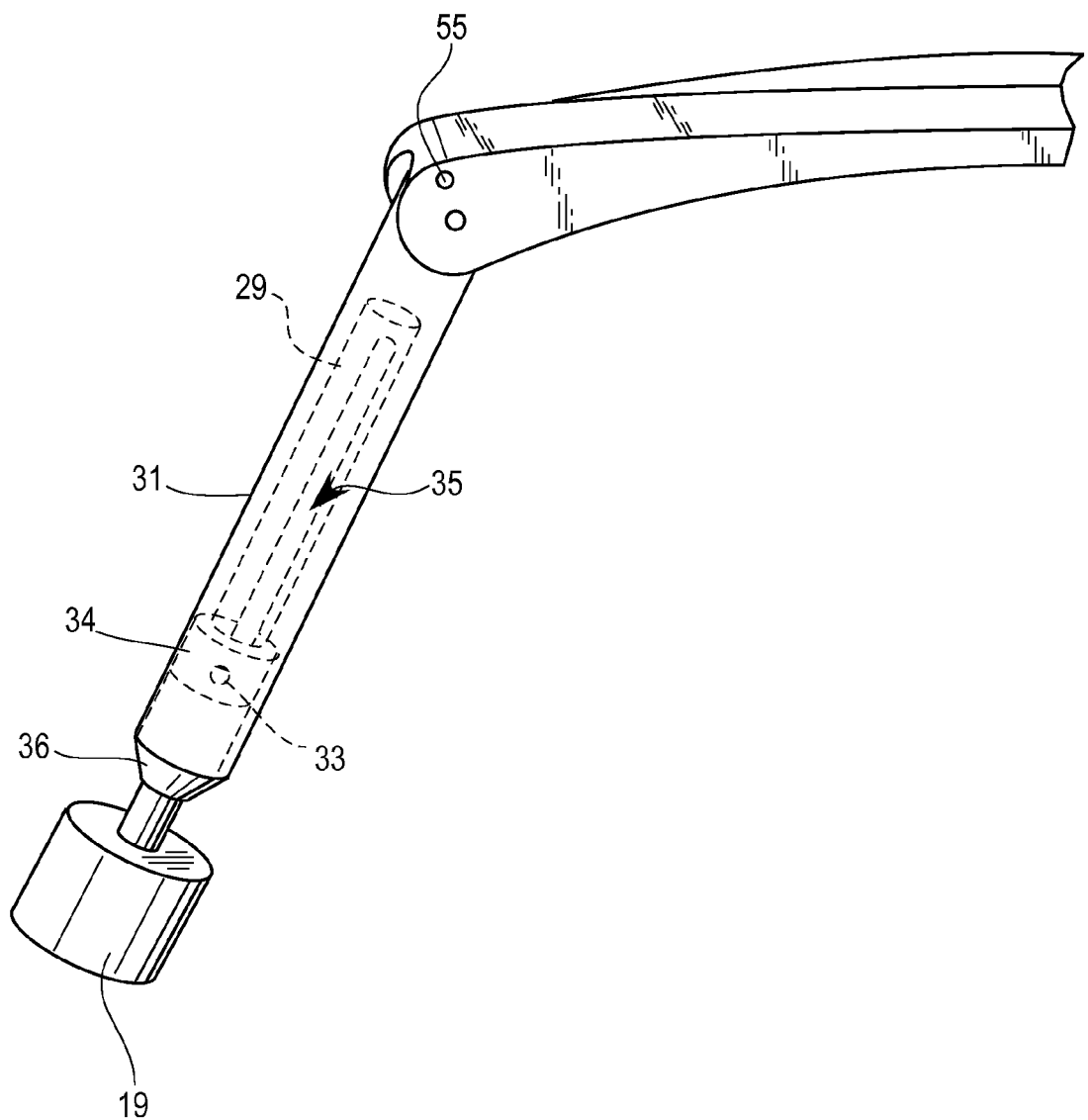
FIG. 6 depicts a transparent view of a telescoping stabilizer leg according to an illustrative embodiment of the invention.

FIG. 6 depicts a transparent view of telescoping leg 7 in more detail according to an illustrative embodiment of the invention. Leg 7 extends outward and downward from wing 1 and comprises an inner tube 29, adapted to telescope within outer tube 31. Leg 8 is similarly or identically constructed with inner tube 30 telescoping from outer tube 32. The degree of extension can be adjusted by use of cross pin 33 to set traveling nut 34 along inner tube slot 35. Traveling nut 34 is positioned within internally tapped outer tube 31 by rotation of inner tube 29. Rotation of weight 19 can effectuate movement of traveling nut 34 if weight 19 is fixed to inner tube 29. Generally, this would preferably be accomplished with inner tube 29 extended entirely out of outer tube 31 so the end of slot 35 is stopped by pin 33. The adjustment mechanism can allow the unfolded leg length to be maintained when the apparatus is folded and then unfolded. Thus, a selected degree of extension (and thus of rig bottom-heaviness) would be preserved for future unfolded deployments, even though inner tube 29 or 30 have repeatedly been pushed upward when folding the stabilizer. An inner tube exit guide 36 can be threaded into the end of outer tube 31 to stop traveling nut 34 from being completely withdrawn and also as a close-fitting guide to help keep inner tube 29 in column with outer tube 31. A similar or identical adjustment mechanism can also be provided for leg 8.

Figure 15:
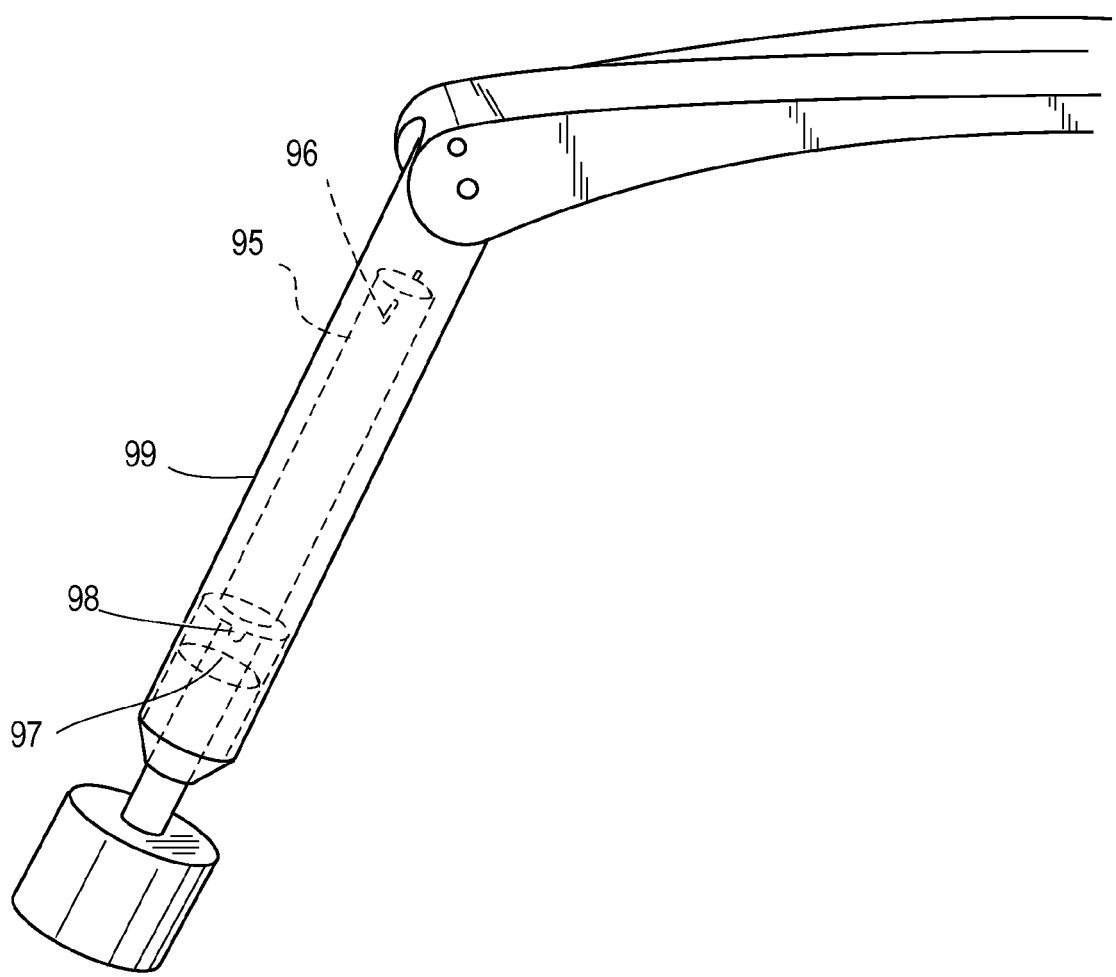
FIG. 15 depicts an inner tube extension limitation mechanism according to a further illustrative embodiment of the invention.

FIG. 15 depicts an alternative mechanism to set the extended position of inner tubes with respect outer tubes. In this embodiment, inner tube 95 has a pin 96 fixedly attached at or near its top. Traveling nut 97 has a notch 98 that is substantially complimentary to pin 96. When inner tube 95 is extended from outer tube 99, pin 96 sits within notch 98 so that upon rotation of inner tube 95, traveling nut 97 can be positioned internally along a length of outer tube 99 via a complimentary threaded configuration. Notch 98 need not extend to the edge of traveling nut 97 as shown, but need only be sufficient to accommodate pin 96 for the purpose of turning, and thus, advancing traveling nut 97. Pin 96 has a length short enough to avoid interference with internal threads of outer tube 99. The embodiment depicted in FIG. 15 provides a mechanism analogous to a flat head screwdriver driving a notched screw. It is noted though that other complimentary shapes between inner tube 95 and traveling nut 97 that allow them to engage in a manner by which traveling nut 98 can be advanced within outer tube 99 are within the scope of the invention.

Figure 10:
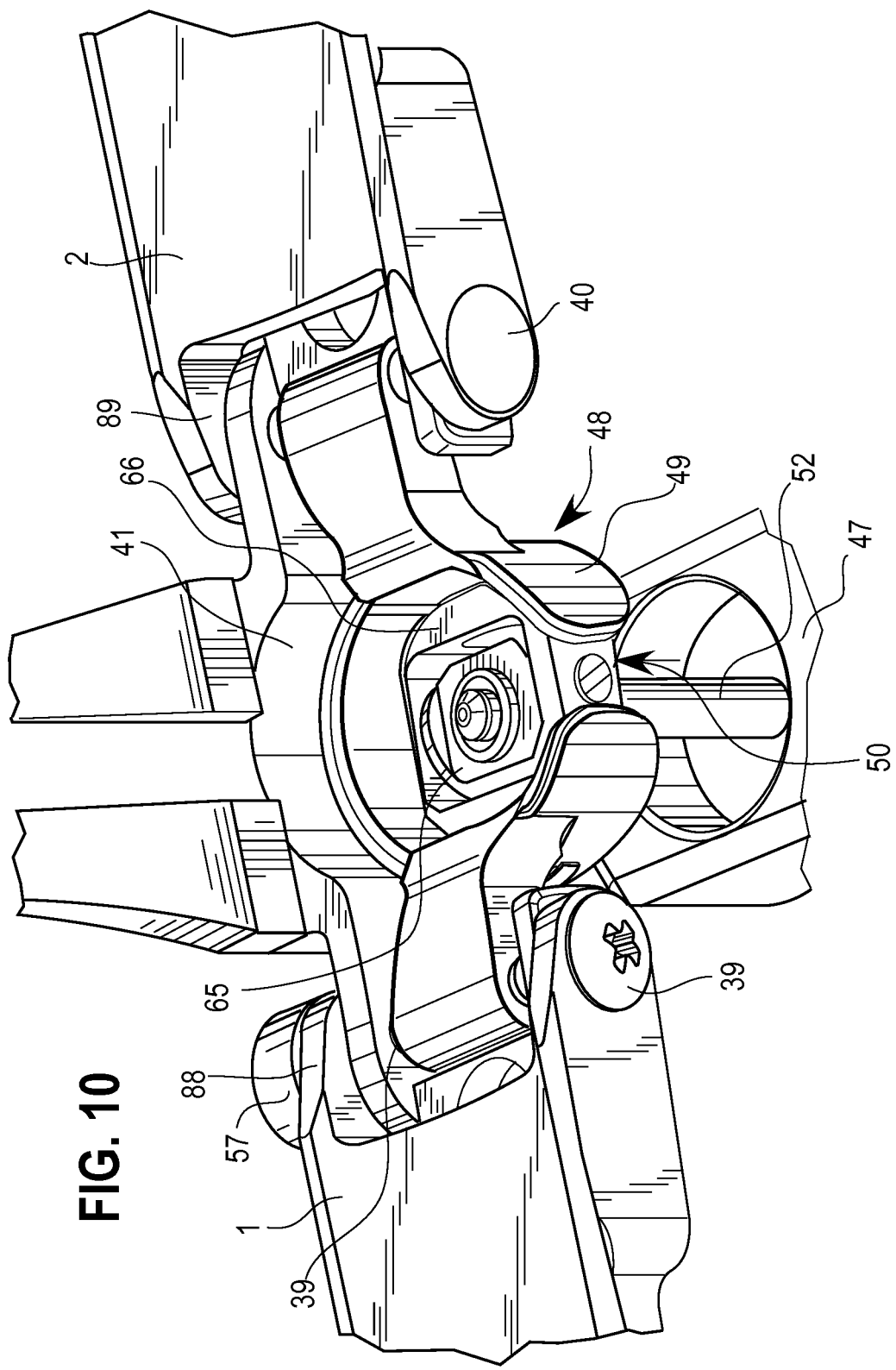
FIG. 10 depicts a gimbal assembly according to an illustrative embodiment of the invention.

Stabilizer 10 includes a gimbal assembly 48, a detail of which is shown in FIG. 10 according to an illustrative embodiment of the invention. Gimbal assembly 48, provides three orthogonal degrees of angular freedom by means of bearing pairs between handle shaft 52 and a gimbal inner mounting block 65, and between middle block 65 and a middle gimbal ring 66, and between gimbal ring 66 and an outer gimbal ring 49. Gimbal assembly 48 is mounted to bridge 41 by means of axles 39, 40. Tilt-axis trim knob 57 turns threaded axle 39 to position gimbal assembly 48 with respect to bridge 41 in order to fine-tune stabilizer balance in the tilt axis. When knob 57 is turned, it turns threaded axle 39, which engages gimbal outer ring 49 and causes it to move along linear bearing axle 40 to traverse the available distance between axle yokes 88, 89 that are opposing parts of bridge 41. This adjustment is used to position the gimbal center under the center of mass of the entire stabilizer plus payload, or other desired position, regardless of the idiosyncratic weight distribution of a mounted image device, and thus trim the attitude of the stabilizer to hang upright in the tilt axis, or at another chosen angle. Alternate gimbal trim arrangements are also possible within the scope of the invention in order to move gimbal assembly 48 bi-directionally with, for example, an additional stage axis.

Outer gimbal ring 49 has an opening 50, preferably with smoothly tapered edges so as not to impede folding by catching on pad 51. Outer gimbal ring opening 50 may be a 'vertical' slit that can have two functions: It permits handle shaft 52 and its associated handle 47 to swing upward approximately 180° in order to transition from operational mode as in FIG. 1 to folded mode as seen in FIG. 2. It also facilitates a more dynamic operating style since outer gimbal ring opening 50 provides a tactile indication of where to add pressure, such as by pressing with the thumb, in order to more aggressively orient the image device lens axis.

Figure 12A:
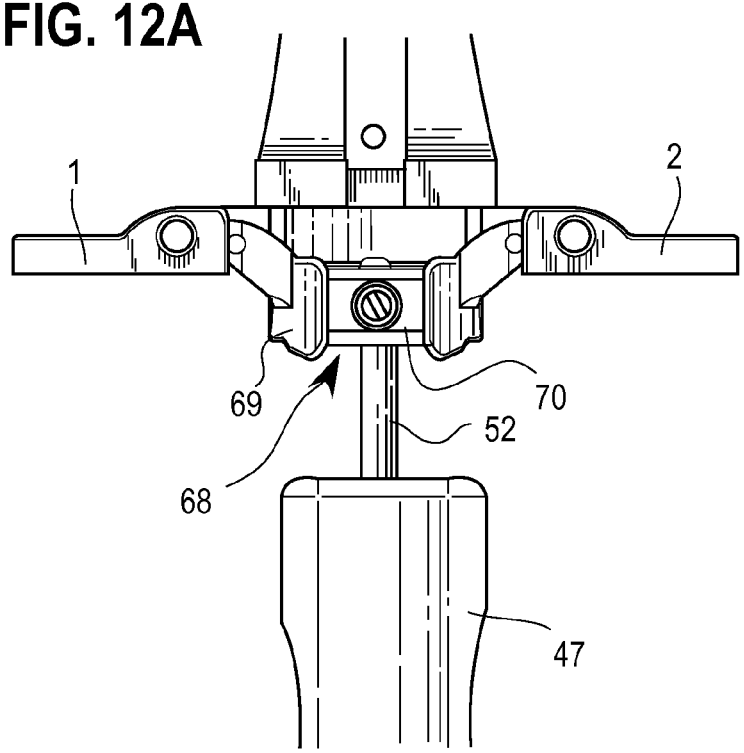
FIG. 12*a* shows a gimbal with an enlarged opening according to an illustrative embodiment of the invention.
Figure 12B:
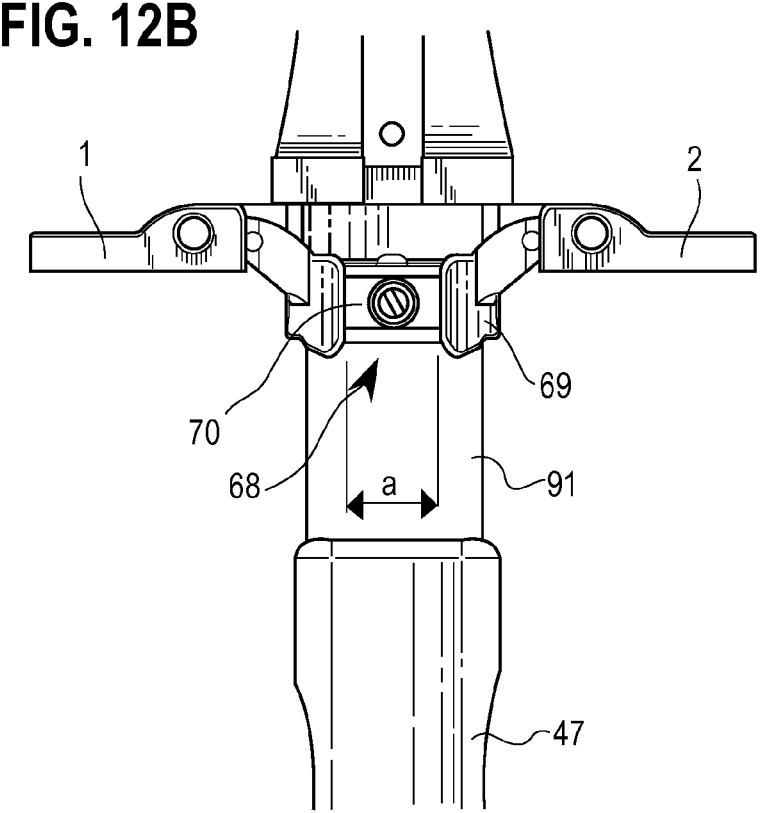
FIG. 12*b* shows a gimbal with an enlarged opening and a resilient pad around a handle shaft according to an illustrative embodiment of the invention.

FIGS. 12a, 12b depict illustrative embodiments of the invention with an enlarged outer gimbal ring opening 68. FIGS. 12a, 12b show the apparatus without and with a resilient, compressible pad 91 around a handle shaft 52, respectively.

The wider opening 68, for example approximately 0.35 inches wide (dimension "a" in FIG. 12b) in a 0.6-0.7 inch diameter outer gimbal ring 69, allows an operator to contact a middle gimbal ring 70 without touching the edges of outer gimbal ring 69 that define opening 68, or with just minimal contact and pressure. Since opening 68 is in outer gimbal ring 69, this means the operator is controlling middle gimbal ring 70 without inhibiting or minimally affecting motion of outer gimbal ring 69. Thus, roll motion may be controlled, without adversely affecting tilt motion. An operator can therefore choose to control mainly the motion of middle gimbal ring 70 with a thumb for example, but can still control outer gimbal ring 69 since it remains accessible, for example by applying pressure to the outer ring gimbal edges that form opening 68.

Illustrative gimbal ring opening width ranges for a 0.6 to 0.7 inch outer gimbal ring include about 0.25 inches to about 0.45 inches.

Middle gimbal ring 70 may have a portion that protrudes beyond outer gimbal 69 for possibly easier access and greater independent control of middle gimbal ring 70 with respect to outer gimbal ring 69 and vice versa.

In general, the embodiments shown in FIGS. 12a, 12b reduce contact with outer gimbal ring 69 by an operator's thumb, for example, and allow the operator's finger to be primarily grounded on middle ring 70. Middle gimbal ring 70 is generally fixed as to tilt motion with respect to handle 47, but allows roll motion. Tilt motion is provided by outer gimbal ring 69. Thus, the wider opening provides somewhat independently controlled operation of roll and tilt motions.

Figure 7:
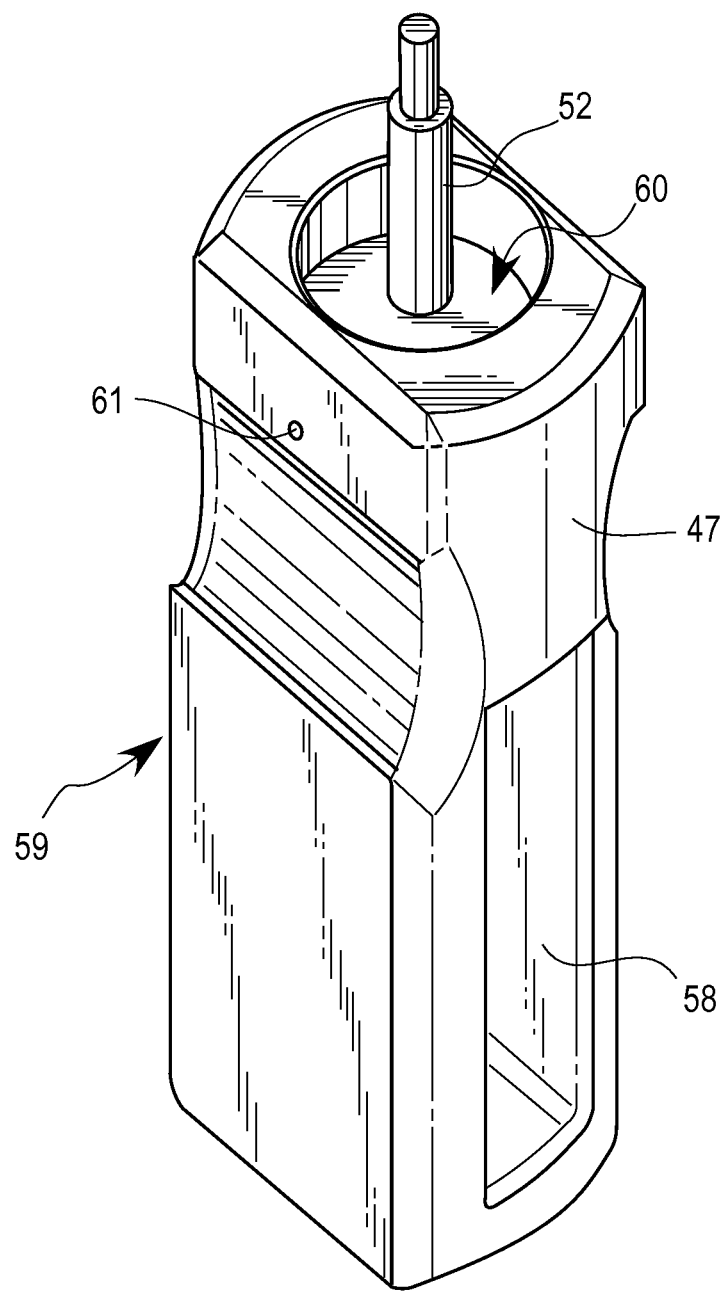
FIG. 7 depicts a stabilizer handle according to an illustrative embodiment of the invention.

FIG. 7 depicts a handle according to an illustrative embodiment of the invention. Handle 47 is disposed beneath gimbal assembly 48 substantially at or near the stabilizer's center of gravity, as shown, for example, in FIG. 3. Handle off-sets are also possible with associated changes to the remaining configuration to accommodate balancing and folding.

Optionally, a resilient pad 51, as shown for example in FIG. 3 (cylindrical in this embodiment), can be disposed around shaft 52, extending into a well 60 in handle 47. The resilient, compressible pad 51 may completely surround central handle shaft 52, or be strategically placed to affect tilt motion. Set-screw 61 permits removal of resilient pad 51 by disengaging gimbal shaft 52 and permitting it to be removed from handle 47. Resilient pad 51 is preferably made of lightweight foam and is stow-able, or at least partially stow-able, in handle well 60. Well 60 may be oval-shaped in order to compress the sides of cylindrical resilient pad 51 when stowed, and thus, inhibit pad 51 from easily re-inserting itself during 'soft' operation of the stabilizer, however, a cylindrical resilient pad is within the scope of the invention.

Gimbal assembly 48 is preferably open and unobstructed above, except when payload 10 is mounted, thus preserving room for resilient pad 51 when handle 47 is swung upward to the folded position. Direct control over pan and tilt can be established, either by 'hybrid' operating with resilient pad 51 intervening between handle 47 and gimbal assembly 48, or by stowing resilient pad 51 and operating entirely via thumb pressure on the center of mass through opening 50.

When resilient pad 51 is slid up and deployed between handle 47 and gimbal assembly 48 it exerts influence upon gimbal outer ring 49 to cause the stabilizer to mimic the selected angle of handle 47. Thus, in this embodiment an operator only needs to hold handle 47 approximately upright, and aimed in the desired direction, and the stabilizer will seek the "average" handle angle, substantially disregarding momentary bumps and aberrations. If the operator rotates handle 47 slowly, the slight friction against gimbal assembly 48 will soon cause the stabilizer to follow and 'pan' the camera. Counter-rotation of handle 47 will soon cause it to stop rotating. This style of operating can be thought of as 'damped' or loosely coupled, and is similar to what happens when steering a boat or plane wherein course changes over time, not instantly.

Operators may desire to vary the thumb pressure, from almost non-existent when the camera is pointed as desired, to heavier when sudden moves have to overcome the natural inertia of the stabilizer. Having resilient pad 51 withdrawn may also permit handle 47 to be held somewhat non-vertical, which is sometimes more comfortable for low-angle shots near the ground and large-scale 'boom' maneuvers where the camera is raised from floor to high overhead.

Figure 13A:
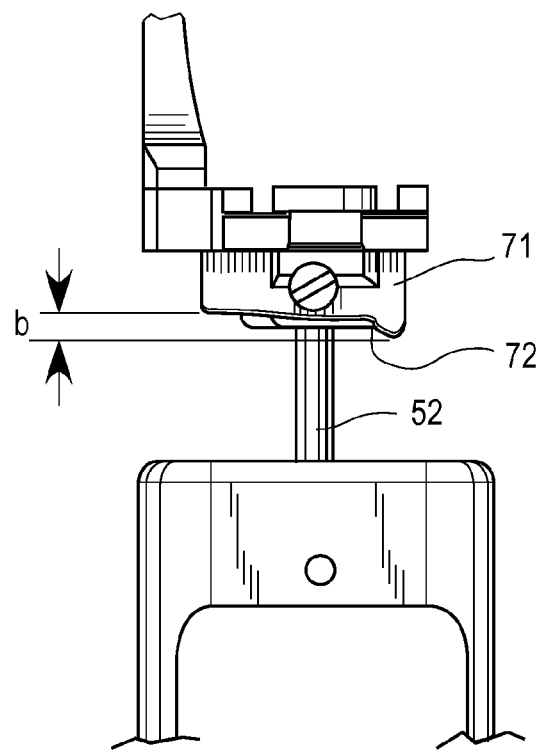
FIG. 13*a* shows a gimbal having an outer ring with a slanted edge according to an illustrative embodiment of the invention.
Figure 13B:
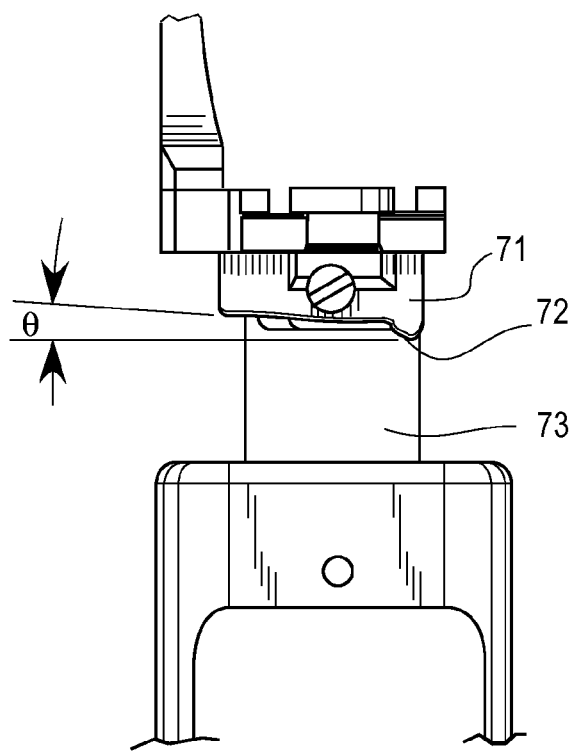
FIG. 13*b* shows a gimbal having an outer ring with a slanted edge and a resilient pad around a handle shaft according to an illustrative embodiment of the invention.

FIGS. 13a, 13b depict side views of a stabilizer without and with, respectively, a compressible, resilient pad 73 disposed about central handle shaft 52, according to illustrative embodiments of the invention. Outer gimbal ring 71 has a lower edge 72 that is slanted with respect to the "horizontal." The space created by slanted outer gimbal ring edge 72 between outer gimbal ring 71 and resilient pad 73 allows outer gimbal ring 71 to come into contact with pad 73 later than it would compared to an outer gimbal ring without the slanted lower edge. This alters the acceleration of the tilt motion as compared to a configuration with a "horizontally" disposed outer gimbal ring lower edge. In an illustrative embodiment of the invention, the vertical distance between the lowest point of outer gimbal ring lower edge 72 and the highest point of outer gimbal ring lower edge 72, as identified by "b" in FIG. 13a, is approximately 3/32 of an inch, and angle θ (shown in FIG. 13b), as measured from the horizontal to the outer gimbal ring lower edge 72, is approximately 6°. Illustrative ranges of dimensions include for example, a vertical distance in the range of about 1/16 inch to about 1/8 inch and an angle in the range of about 4° to about 8°.

Preferably, the entire stabilizer and its payload are balanced to depend from the gimbal with minimal bottom heaviness, yielding a pendular period of from one second to many seconds, depending on operating style and preference. Pendular period may be checked by holding weights 19, 20 off level, letting them swing and counting the time until they begin to swing back. Generally, 'soft' operating, using only resilient pad 51, works best with a slow pendular period of two seconds or more. Harder 'coupled' operating may work best a bit more bottom-heavy, with a drop time of as little as one second.

Returning to FIGS. 2 and 11, a description of stabilizer 10 in a folded position according to an illustrative embodiment of the invention will be provided. Wings 1, 2 are folded upward respectively on axles 39, 40, which are attached to bridge 41 (visible in FIG. 3). Outer tubes 31, 32 are folded downward on axles 42, 43 and nest within troughs 5, 6 on the underside of wings 1, 2. Inner tubes 29, 30 are telescopically collapsed within tubes 31, 32 and captured, along with inner tube exit guides 36, 37 by prong-shaped bridge wing-stops 45, 46 so that counterbalancing weights 19, 20 are likewise restrained.

When wings 1, 2 are folded, end-stops 21, 22 would protrude from each side into the volume of handle 47. Symmetrically opposing handle slots 58, 59, as shown in FIG. 7, are therefore provided to enclose end-stops 21, 22 regardless of their locked position along wings 1, 2.

Split outer gimbal ring 49 permits handle 47 and associated optional resilient pad 51 to be swung upward for compact folding. Handle 47 is thus positioned to be captured in a substantially mated configuration by troughs 3, 4 in wings 1, 2. Handle 47 is additionally clamped from above by image-device top clamp plate 15, which can be compressed to abut handle 47.

This folded arrangement provides that wings 1, 2, even though preferably stiff due to their I-beam type construction, do not, when folded, add more than a preferably thin layer of material between their troughed sides to the overall width of the folded stabilizer. Thus, outer tubes 31, 32 fold closely adjacent to the sides of handle 47. Likewise, in this embodiment the total height of the folded stabilizer is not much greater than the length of handle 47 and shaft 52 since all folded components occupy virtually the same longitudinal area.

In a further embodiment, mechanisms such as spring-detented components are employed to select folded and unfolded positions, which reduce the chance that incomplete opening might affect balance. Complementary additional spring assemblies may also provide, for example, 'one button' opening, in the manner of compact umbrellas, since it is likely that the opportunity to stabilize an ambulatory video might be fleeting and would reward rapid deployment.

In an exemplary embodiment of the invention, the stabilizer in the folded configuration would substantially fit within the front profile of the associated smartphone or other image device. Since wings 1, 2 and handle 47 rotate upward and legs 7, 8 rotate downward, all of the aforementioned components occupy substantially the same longitudinal space, as can be seen in FIG. 2.

Generally, the most compact configuration for any given payload requires achieving the minimal gimbal-to-payload distance. Illustrative embodiments of the invention minimize this distance by reducing and preferably eliminating any structure between middle gimbal ring 66 and the bottom surface of image device payload 12. This closeness would therefore only be limited by the swing radius of ring 49.

Figure 11:
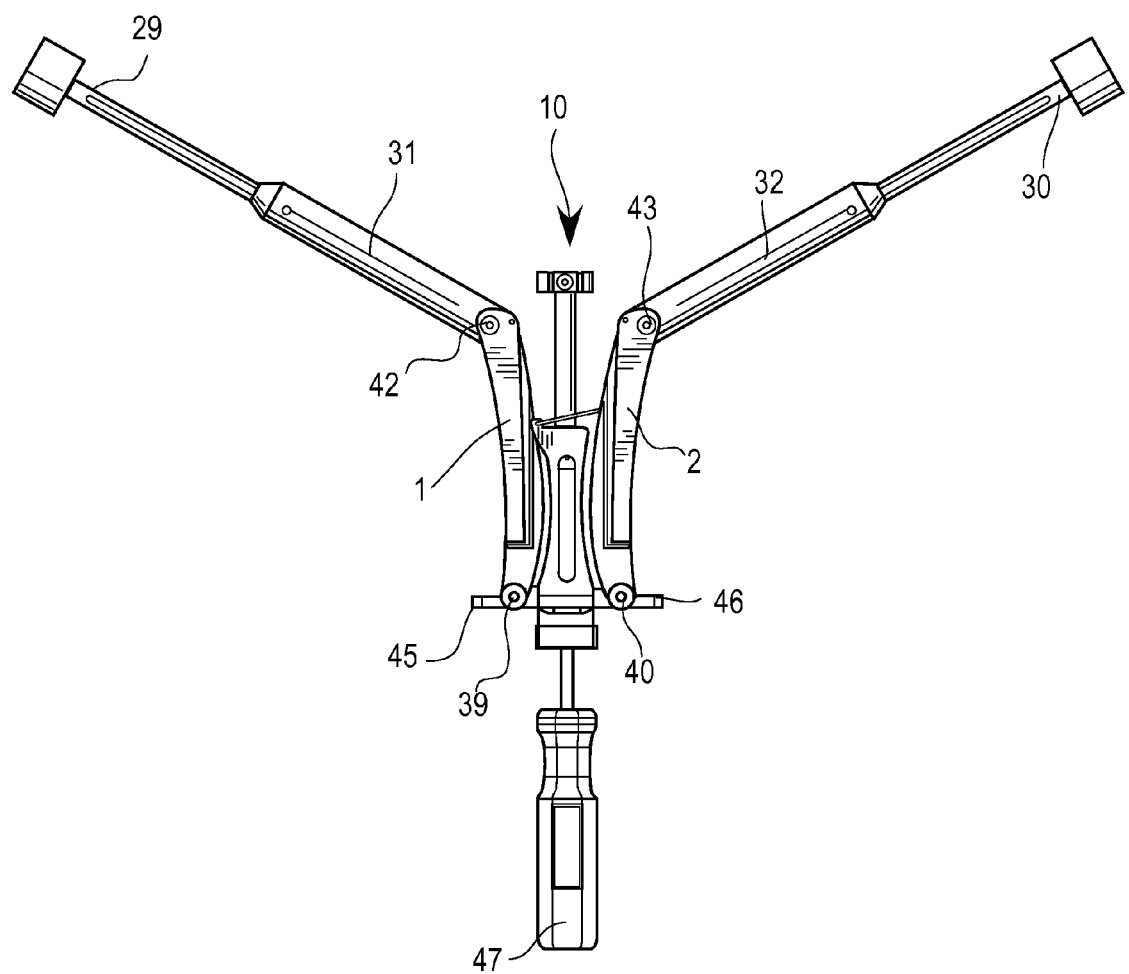
FIG. 11 shows a stabilizer in transition between a folded and unfolded configuration according to an illustrative embodiment of the invention.

Referring back primarily to FIG. 1 and further to FIGS. 2, 3 and 11, the set-up and balancing of stabilizer 10 will be described according to an illustrative embodiment of the invention. Stabilizer 10 is folded without image device 12 in position. To unfold stabilizer 10, outer tubes 31, 32 are swung outward about axles 42, 43 until stopped in operating position by raised surfaces 53, 54 contacting registration stop pins 55, 56, as identified in FIG. 2. Wings 1, 2 are swung downward until stopped by bridge wing stops 45, 46 and collectively form the mounting surface comprising troughs 3, 4 to receive an image device payload. Inner tubes 29, 30 are pulled out from outer tubes 31, 32 until fully extended based on a preferably pre-set stopping point. As shown in FIG. 6, the stopping point is dictated by traveling nut 34 in outer tube 31 and a corresponding traveling nut in outer tube 32, which engage internal threads in outer tubes 31, 32. Pin 33 and a corresponding pin in inner tube 30 engage the upper surface of the slot 35 in inner tube 29 and a corresponding slot in inner tube 30 to pre-set the length. Handle 47 may be mounted on a stand fixed to a corner of a table so that inner tubes 29, 30 and weights 19, 20 can dangle freely on either side; and resilient pad 51 can be slid down into well 60 in handle 47 so that it does not influence the gimbal attitude.

Image device 12 is set upon mounting troughs 3, 4 and clamped from above by image device top clamp plate 15. If the stabilizer attempts to invert itself, additional incremental weights can be added, preferably co-axially, to the bottom of weights 19, 20 until the stabilizer rights itself. Image device 12 can be slid laterally along the mounting surface until it is roughly in balance side to side. A user can then alternate between the next three operations until the stabilizer is properly in balance. Although a particular order is suggested, the order of steps, including the previously noted step, can be varied as the device is balanced. Software, such as a smartphone 'app', can be provided, as described below, that can assist with these procedures:

First: rotate weights 19, 20, which are rotationally affixed to inner tubes 29, 30, raising the traveling nuts, and thus weights 19, 20 until stabilizer 10 is no longer strongly bottom heavy and approaches neutral balance top-to-bottom. If stabilizer 10 becomes top-heavy, rotate weights 19, 20 counterclockwise until it again barely hangs upright. Inner tubes 29, 30 can be marked with scales, such as in inches or centimeters, to assist in presetting known lengths for various payloads.

Second, fine adjust the side-to-side position of payload 12 by pushing it along troughs 3, 4 until the stabilizer hangs upright. It is noted that troughs 3, 4 can form a single trough extending from tip to tip of wings 1, 2, or any desired portion thereof.

Third, adjust trim axis knurled trim knob 57 (visible in FIG. 3), until image device 12 hangs upright in the 'tilt' axis. Trimming to one side could restore verticality for certain devices, such as those with rounded back profiles that might settle into a more off-center mounting position Repeat alternately, with finer and finer precision until stabilizer 10 is balanced. Finally, slide end-stops 21, 22 along slots 23, 24 until they contact the side edges of image device 12. Lock end-stops 21, 22 in place with knobs 27, 28. These stops provide that future deployments from the folded position will return this particular image device to its balanced position.

Note that since legs 7, 8, including tubes 29, 31, 32, 33, are deployed at an approximate 60° angle from the horizontal in this embodiment, Vernier adjustment of side-to-side balance trim can be obtained (with little or no consequence for bottom-heaviness) by screwing one weight 19 or 20 clockwise (moving it upward and inward) and the opposite weight 19 or 20 counterclockwise (moving it outward and downward). The up/down shifts of weights 19 and 20 counter each other, so bottom-heaviness is generally unaffected, but the lateral shifts are both in the same direction, causing a slight shift of the lateral center of balance around the roll axis.

The invention may include a software application, such as in the form of a smartphone 'app' for example, that can indicate the degree of leveling in all axes by referencing its built-in sensors. It can also calculate and display the 'pendular period' to detect the degree of bottom heaviness by integrating consequent level changes in both horizontal axes and calculating the time between their changes of direction. It can therefore prompt specific set-up and balancing steps to cause its level settings and calculated pendularity to approach those of an ideal setup—with camera level and very slightly bottom heavy. Finally, the software application can respond to verbal commands such as "roll camera" and "cut", and thus avoid the disruptive need to touch the image device itself to record and stop a video.

Various embodiments of the invention have been described, each having a different combination of elements. The invention is not limited to the specific embodiments disclosed, and may include different combinations of the elements disclosed or omission of some elements and the equivalents of such structures.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention. For example, the profiles and configuration of components that allow for a compact structure when folded can vary and still achieve the desired result. Additionally, various locking and adjustment mechanisms can be utilized to perform the functions that the particular mechanisms described herein perform. Accordingly, it is intended that the invention not be limited to the specific illustrative embodiments, but be interpreted within the full spirit and scope of the appended claims and their equivalents.

The invention claimed is:

1. A stabilizer comprising:
   a handle;
   a gimbal having an outer ring, a middle ring and an inner ring;
   a handle shaft connecting the gimbal to the handle;
   a first wing and a second wing disposed on opposite sides of the gimbal;
   the first wing and second wing creating a payload mounting surface when extended opposite and in line with one another;
   a clamping device positioned to secure a payload to the mounting surface;
   each of the first and second wings having at least one of an upper trough or a lower trough, each trough disposed longitudinally along at least a portion of the respective wing;
   the first wing pivotally attached to the outer gimbal ring at a first end of the first wing;
   a first leg pivotally attached to a second end of the first wing;
   a second leg pivotally attached to a second end of the second wing;
   each of the first and second wings of complimentary shape to each of the respective first and second legs;
   the handle is at least partially flush to or nests in the wings when the wings are pivoted toward the handle;
   the first leg is at least partially flush with or nests in the first wing when it is pivoted upward; and
   the second leg is at least partially flush with or nests in the second wing when it is pivoted upward.

2. The stabilizer of claim 1 wherein the gimbal provides three degrees of freedom.

3. The stabilizer of claim 1 wherein the clamping device comprises:
   a bridge portion;
   the first and second wings pivotally attached to the bridge portion via axles extending through opposing extensions of the outer gimbal ring;
   a clamping strip extending upward from the bridge;
   a plate adjustably attached to the clamping strip at an upper end of the clamping strip to secure a payload;
   wherein the handle is rotatable upwardly via the gimbal to be disposed against the clamping plate.

4. The stabilizer of claim 1 comprising:
   an opening in the outer gimbal ring dimensioned to accommodate the handle shaft to swing upwardly approximately 180° between an operational mode and a folded mode.

5. The stabilizer of claim 4 wherein the outer gimbal opening has a width in the range of about 0.6 inches to about 0.7 inches.

6. The stabilizer of claim 5 wherein the outer gimbal opening has a width in the range of about 0.25 inches to about 0.45 inches.

7. The stabilizer of claim 1 wherein the outer gimbal has an opening and the middle gimbal ring has a protrusion; and
   wherein when the middle and outer gimbal rings are in the same plane, the middle ring protrusion extends through the outer gimbal ring opening.

8. The stabilizer of claim 1 wherein:
   the first leg has a distal end opposite to the first leg pivotal attachment to the first wing; and the second leg has a distal end opposite to the second leg pivotal attachment to the second wing;
and wherein the stabilizer comprises a weight attached to the first leg distal end; and
a weight attached to the second leg distal end.

9. The stabilizer of claim 8 wherein the weights are eccentrically rotationally attached to the legs.

10. The stabilizer of claim 1 wherein:
the first leg comprises an outer leg portion and an inner leg portion telescopically engaged to the outer leg portion;
the second leg comprises an outer leg portion and an inner leg portion telescopically engaged to the outer leg portion; and
a device to set an extended position for repeatable positioning upon telescoping of the inner leg portion from the outer leg portion.

11. The stabilizer of claim 1 comprising:
a first end stop adjustably disposed on the mounting surface of the first wing; and
a second end stop adjustably disposed on the mounting surface of the second wing;
wherein the distance between the end stops in the extended configuration is maintained upon folding and extending the wings.

12. The stabilizer of claim 10 wherein at least one leg comprises a device to set an extended position for repeatable positioning upon telescoping of the inner leg portion from the outer leg portion, the device having:
a longitudinal slot disposed on the inner leg portion;
the outer leg portion internally tapped;
a traveling nut engageably disposed within the internally tapped leg outer leg portion;
a cross pin disposed in the traveling nut and through the inner leg slot thus setting the degree to which the inner leg portion can be extended from the outer leg portion by serving as a stop to the upper slot end;
the traveling nut positionable by rotation of the inner leg portion;
thereby allowing the leg to be repeatably extended to the position dictated by the set location of the traveling nut.

13. The stabilizer of claim 12 comprising:
a notch in the traveling nut complimentary to and engageable with the pin;
wherein when the pin and notch are engaged, rotation of the inner leg portion advances the traveling nut to create a stop to limit travel of the inner leg portion within the outer leg portion.

14. The stabilizer of claim 1 wherein:
each of the first and second wings has an upper trough and a lower trough, each trough disposed longitudinally along at least a portion of the respective wing;
wherein when the wings are pivoted toward the handle, the handle nests in the lower troughs of the wings;
wherein when the first leg is pivoted upward it nests in the upper trough of the first wing; and
wherein when the second leg is pivoted upward it nests in the upper trough of the second wing.

15. The stabilizer of claim 1 wherein the gimbal middle ring is linearly adjustable for balancing the stabilizer fore and aft.

16. The stabilizer of claim 10 wherein:
each outer tube has a slit extending partially along the outer tube's length; and
each leg has a locking pin engageable with the leg's outer tube slit and the leg's inner tube to limit travel of the leg's inner tube within the leg's outer tube.

17. A device configured to balance the stabilizer of claim 1 having an image device thereon wherein the stabilizer has:
a first leg distal end opposite to the first leg pivotal attachment to the first wing; and
a second leg distal end opposite to the second leg pivotal attachment m the second wing;
a weight attached to the first leg distal end;
a weight attached to the second leg distal end;
a first end stop disposed on tile mounting surface of the first wing; and
a second end stop disposed on the mounting surface of the second wing;
wherein the device comprises a processor, a memory, the memory embodying instructions which causes the processor to balance the stabilizer by:
rotating the weights until the stabilizer is substantially in neutral balance top-to-bottom;
adjusting the side-to-side position of the image device by adjusting its position along the wings until the stabilizer hangs substantially upright;
adjusting a trim axis until the camera hangs substantially upright in the tilt axis; and sliding the end-tops along the wings until they contact the side edges of the camera.

18. A method of capturing a video image comprising:
providing a stabilizer according to claim 1;
providing a video capturing device;
balancing the stabilizer with the video capturing device thereon; and
capturing a video image with the video capturing device.

* * * * *